(12) United States Patent
Bengtson (10) Patent No.: US 8,239,702 B2
(45) Date of Patent: Aug. 7, 2012

(54) ONE GLOBAL PRECISE TIME AND ONE MAXIMUM TRANSMISSION TIME

(75) Inventor: John Bengtson, Hojbjerg (DK)

(73) Assignee: Vestas Wind Systems A/S, Aarhus N (DK)

( * ) Notice: Subject to any disclaimer, the term of this patent is extended or adjusted under 35 U.S.C. 154(b) by 111 days.

(21) Appl. No.: 12/787,237

(22) Filed: May 25, 2010

(65) Prior Publication Data

US 2010/0305767 A1 Dec. 2, 2010

Related U.S. Application Data

(60) Provisional application No. 61/184,189, filed on Jun. 4, 2009.

(30) Foreign Application Priority Data

May 25, 2009 (DK) .................................. 2009 00651

(51) Int. Cl.
*G06F 15/16* (2006.01)

(52) U.S. Cl. ........................................ 713/375; 713/600

(58) Field of Classification Search .................. 713/375, 713/600

See application file for complete search history.

(56) References Cited

U.S. PATENT DOCUMENTS

| | | | |
|---|---|---|---|
| 5,721,738 A * | 2/1998 | Kubota et al. ................. | 370/508 |
| 5,923,902 A | 7/1999 | Inagaki | |
| 6,483,856 B1 * | 11/2002 | Bird ............................. | 370/503 |
| 7,319,936 B2 * | 1/2008 | Reichert ........................ | 702/125 |
| 7,765,422 B2 * | 7/2010 | Abdel-Ghaffar .............. | 713/400 |
| 2003/0007473 A1 * | 1/2003 | Strong et al. .................. | 370/338 |
| 2003/0114938 A1 * | 6/2003 | Albrecht et al. ................. | 700/2 |
| 2006/0033338 A1 * | 2/2006 | Wilson ............................ | 290/44 |
| 2007/0050085 A1 * | 3/2007 | Hashimoto et al. ........... | 700/245 |
| 2007/0176432 A1 * | 8/2007 | Rolt ................................ | 290/55 |

(Continued)

FOREIGN PATENT DOCUMENTS

EP  1538497 A2  6/2005

(Continued)

OTHER PUBLICATIONS

Danish Technical Examination No. 1; Application No. PA 2009 00651; Jan. 6, 2010; 3 pages.

(Continued)

*Primary Examiner* — Mark Connolly
(74) *Attorney, Agent, or Firm* — Patterson & Sheridan, LLP (57) ABSTRACT

Method of controlling a wind power system including a plurality of system elements, the wind power system including a plurality of data processors distributed in the system elements, the method including the steps of: synchronizing at least a part of the data processors to at least one reference signal distributed to the data processors from a time synchronization arrangement, associating the data processors with local clock generation circuitries, wherein the local clock generation circuitries associated with data processors of a first subset of the data processors have a peak-to-peak tracking jitter higher than or equal to a predetermined threshold value and wherein a second subset of the data processors have a peak-to-peak tracking jitter less than the predetermined threshold value, controlling at least one of the system elements at least partly by means of a data processor from the first or second subset of data processors.

20 Claims, 3 Drawing Sheets

U.S. PATENT DOCUMENTS

| | | | |
|---|---|---|---|
| 2008/0157538 A1* | 7/2008 | Lewis | 290/4 R |
| 2008/0195255 A1* | 8/2008 | Lutze et al. | 700/291 |
| 2009/0105850 A1 | 4/2009 | Miyata et al. | |
| 2009/0128402 A1 | 5/2009 | Altenschulte | |
| 2009/0265352 A1* | 10/2009 | Holenstein et al. | 707/8 |

FOREIGN PATENT DOCUMENTS

| | | |
|---|---|---|
| EP | 1757410 A2 | 2/2007 |
| WO | 2009068034 A1 | 6/2009 |

OTHER PUBLICATIONS

Danish Search Report; PA 2009 00651; Dec. 22, 2009; 1 page.

Alonso, et al.; "Industrial Control System for a Back-to-Back Multilevel NPC Converter based on DSP and FPGA"; Industrial Electronics; Jun. 2007; 6 pages.

International Search Report; PCT/DK2010/050113; Jul. 28, 2010; 2 pages.

* cited by examiner

ONE GLOBAL PRECISE TIME AND ONE MAXIMUM TRANSMISSION TIME

CROSS-REFERENCE TO RELATED APPLICATIONS

The present application claims priority from Danish patent application PA 2009 00651 filed on May 25, 2009. In addition, the present application claims the benefit under 35 U.S.C. §119 (e) of the U.S. Provisional Patent Application Ser. No. 61/184,189 filed on Jun. 4, 2009. The content of all prior applications is incorporated herein by reference.

FIELD OF THE INVENTION

The invention relates to a method of and a system for controlling a wind power system.

BACKGROUND OF THE INVENTION

Over recent years monitoring, control and regulation in wind power systems have become increasingly more sophisticated and as a consequence requirements to data processing speed, precision and reliability in data communication and in relation to the temporal correlation of data have increased. Consequently, requirements e.g. to precision in the time domain and knowledge of data communication infrastructure of a wind power system have increased.

The latter is especially the case in wind power plants which today often covers large geographical areas and consequently the amount of data in the data communication infrastructure of the wind power plant have increased. The increased amount of data transmitted through the data communication network may lead to different uncertainties which may have effect on the control system of the wind power plant.

SUMMARY OF THE INVENTION

The invention relates to a method of controlling a wind power system comprising a plurality of system elements, said wind power system further including a plurality of data processors distributed in said system elements, the method comprising the steps of:
synchronizing at least a part of said data processors to at least one reference signal distributed to said data processors from a time synchronization arrangement,
associating at least one of said data processors with a node and associating at least one of said data processors with a remote node,
establishing a transmission time estimate between said node and a said remote node,
establishing an armed control signal comprising an execution instruction associated with a time of execution, the execution instruction defining instructions to be executed by a data processor associated with the remote node at a time defined by the time of execution,
correlating the established transmission time estimate between the node and the remote node with the time of execution of the armed control signal,
transmitting the armed control signal from the node to the remote node prior to the time of execution by a time interval which corresponds to or is greater than the established transmission time estimate.

The system elements comprised in the wind power system may according to the invention e.g. be understood as elements of a wind power plant or elements communicating with a wind power plant. Hence system elements may e.g. be wind turbines, substations, controllers located internal or external in relation to the wind power plant, communication units for communicating internally within the wind power plant or from the wind power plant to external communication units.

Whether the system elements are communicating, controlling or processing data, the system elements may comprise one or more data processors, and the data processors are distributed in the system elements according to the individual tasks and implementations of the system elements.

It should be noted that not all system element comprises data processors, an example could be a metrological station only including a temperature and/or a wind measuring unit.

The control of a wind power system, in particular large systems such as wind power plants with several system elements such as wind turbines and substations, is according to the present invention advantageously supported by the provision of an instrument for planning or prioritizing the transmission of control signals within the system. This supportive instrument is based on estimates of the transmission time between the nodes in the system, in particular the transmission time from the central controller or other control signal generating node to the wind turbine controllers or other control signal receiving nodes located remote from the central controller. The estimates of the transmission time may advantageously be used for calculating e.g. the latest possible time at which a control instruction have to be transmitted in order to reach the receiver in time for carrying out the instruction at the desired time, or e.g. sorting or prioritizing the control signals according to not only their desired execution time, but their execution time minus the estimated transmission time.

The term transmission time or transmission time estimate is to be understood as a summation of delays occurring in a data communication network in relation to transmitting information e.g. in form of a data packet, from one node to another node in the data communication network. Examples of delays included in the transmission time could be transmission delay, processing delay, queuing delay, propagation delay, etc. Furthermore in relation to transmission start and receiving of a data packet, further handling and processing delays may occur.

It should be noted that not all of the mentioned delays are present in all types of data communication networks or transmission protocols.

According to the invention a node typically defines a component in the data communication network or in a system element. Such component could e.g. be a network switch or other units intended for controlling, measuring or physically distributing data packets in a data communication network or in a system element.

Furthermore nodes may be defined as controllers or measuring devices of the wind power system, generating or receiving control instructions. It should be noted that typically one or more data processors are present in or in relation to nodes in a wind power system.

In other words, nodes according to the invention are components of the wind power system, between which data is transmitted; hence a substation or wind turbine may also be referred to as nodes.

A node may both be referred to as "node" and as "remote node" only difference is that the "remote node" is the receiver of instructions or measurements originating from a producing "node". The same node may be both "node" and "remote node" e.g. in case a node receives data and then passes this data on to another node in the wind power system.

The control method of the present invention is particularly beneficial in large wind power plants with several wind turbines and long distances, because the transmission times in such a system may be significantly different due to different, large distances and different network topologies and technology. The latter is particularly significant in wind power plants that have been expanded in several turns, and therefore comprise technology and topologies of different age and scale.

According to the scope of the invention, a central controller is provided for controlling several remote wind turbines and possibly also substations. This is typically enabled by coupling the central controller, the wind turbines and the substations to a data network as nodes. A wind turbine may comprise several nodes, e.g. if several data processors within the wind turbine or related to the wind turbine act as individual network components. In alternative embodiments the wind turbines comprise a single node constituted by e.g. a wind turbine controller, which in turn controls local data processors within the wind turbine. It is noted, that any suitable kind of data network or data communication means is within the scope of the present invention. In a preferred embodiment, the network comprises a SCADA compatible network.

As mentioned above, the present invention is particularly beneficial in large systems, e.g. where a central controller controls several remote wind turbines and possibly substations within a wind power plant. An alternative embodiment within the scope of the present invention comprises control internal in a wind turbine, where different data processors, e.g. a pitch controller, top controller, hub controller, etc. are controlled by a wind turbine controller, and the transmission time estimates represent the delay from the wind turbine controller to the different data processors. It is noted that the execution of an armed control signal at an execution time may comprise forwarding the instruction to a downstream data processor.

Evidently, an embodiment where several data processors are associated with a single node or remote node, e.g. where all data processors in a wind turbine communicates through the wind turbine controller, or where several control processors communicates through the central controller, is within the scope of the present invention.

An advantage obtained within the scope of the present invention comprises control over very large distances, where control signals may be generated and transmitted from a node, e.g. a control centre, e.g. in Denmark, to remote nodes, e.g. wind turbine controllers located in wind turbines, substations or a central controller of a wind power plant, e.g. in New Zealand. In such a situation the transmission times may become more significant and in turn the possibility of considering the delays into the planning and prioritization may become crucial.

The transmission time estimate should preferably comprise all delays that occur between the time of transmission from the node and the time where the final recipient, the remote node, is able to execute the instruction. Hence, the transmission time estimate may include the time it takes for the node to push the control signal, e.g. a data packet, onto the network, the propagation delay representing the time it takes for the signal to travel through the wiring or air, any queuing delays present in any node, remote node or intermediate network components, any processing delay caused in any intermediate network components or associated with the reception and decoding of the control signal at the remote node, etc.

Transmission time estimates in a wind power system may comprise delays from the microsecond range to the millisecond range, but any range of delay is within the scope of the present invention. In particular in embodiments where the control signals are generated e.g. in one country and received in another, the transmission time may become significantly larger.

The establishment of transmission time estimates, in data communication network used for hard real-time control, is preferably carried out by summing up of worst-case delays of the different delays occurring in the data communication network. These delays could be obtained by analyzing several transmission delay or transmission time measurements or by calculating the worst-case transmission delays bases on detailed knowledge of the network topology and function.

Preferably the transmission time estimates are regularly or frequently updated by performing transmission time measurements, by carrying out particular communication algorithms, e.g. handshaking algorithms, with the purpose of exposing the transmission time, or by simply including timing information in all or several kinds of data transmissions from which the delays can be derived. In an alternative embodiment, the delays are only established or updated at specific maintenance times, e.g. once every day, at each maintenance or control visit, or only at time of implementing the wind power plant or on specific request.

It should be noted that the data communication network may also include the internal network of system elements for internal data communication between parts or nodes e.g. of the wind turbine or substations.

When using averaged values for transmission time in a data communication network, we will not be able to guarantee that a data packet containing control data always reaches its destination in due time before the scheduled time of execution. Hence a transmission time estimate of transmission time between two nodes of a data communication network based on average values is preferred in data communication network used for soft real-time control e.g. non-time critical control such as control based on temperature measurements.

Often communication networks in hard real-time systems have specific architectures and properties that guarantee the specified worst-case transmission delays are never exceeded. These properties also enable precise and reliable calculations on transmission delays to be executed.

If, the hard real-time data communication network e.g. facilitating control of switch time in a power converter for shaping the power output, is changed e.g. by adding further nodes, more network switches etc, the transmission time estimate of such changed data communication network must be verified again.

According to the invention the terms "soft" and "hard" real-time is interpreted as follows. "Hard" real-time systems are always in synchrony with their surroundings, i.e. data never fails to be delivered in due time for execution. "Soft" real-time systems occasionally allows failure in delivery of data in due time for execution, hence soft real-time systems cannot be guaranteed to always be in synchrony with their surroundings.

According to the invention a hard real-time system could be the control system for controlling the power control, shaping the power output form wind turbines or substations. Still according to the invention a soft real-time system could be the control system for controlling of aero surfaces such as pitch, adaptive edge flaps etc., control of motors, pumps, actuators etc. In soft real-time, if a control signal, in a single occasion, fails to reach its consumer in due time for execution, a delayed execution is likely to do the job perfectly well.

It should be noted that the present invention is applicable both in hard and soft real time data communication systems.

The correlation of the transmission time with the desired time of execution of a particular instruction by a particular data processor may according to the present invention e.g. comprise calculating the remaining time until the desired time of execution and comparing this with the transmission time estimate. If the transmission time estimate is larger, it is unlikely that the particular data processor will be able to receive the instruction in time to execute it at the desired time. If the transmission time estimate is equal to the remaining time, the control signal should be transmitted immediately with maximum priority, e.g. real time priority. If the transmission time estimate is significantly shorter, the controller could hold the control signal to allow other, higher prioritized signals through, or it could transmit it anyway, possibly with a low priority.

In an alternative embodiment within the scope of the present invention the correlation comprises subtracting the transmission time estimate from the time of execution and comparing the resulting time with the current time. If the resulting time is prior to the current time it is unlikely that the remote node will receive the control signal in time. In the event that several control signals are to be transmitted, the sending node should preferably perform the correlations for several signals before transmitting any of the signals, because the correlation results provide an advantageous basis for prioritizing and sorting the transmissions.

Knowledge of transmission time can be used by a data processor producing e.g. control instructions to a consuming data processor, to establish a scheduling scheme which guarantees that control instructions are produced in due time before a required "latest point in time" for transmitting the control instructions to the consuming data processors.

The producing data processor/node may communicate with a scheduler, which preferably is referring to or is synchronous with the established reference signal, hence the production of control instructions by the producing data processor/producing node is executed relative to the reference signal.

The consumer node/remote node may also communicate with a scheduler which is also referring to the reference signal. However, other control methods, as e.g. interrupt based control, may be used.

According to the present invention an armed control signal is understood as a signal comprising as one part of its data a desired time of execution of the instruction also comprised by the signal. Evidently also any variants of this concept as well as equivalents, e.g. two substantially adjacent data signals where one comprises the time of execution and the other the instruction, is within the scope of the present invention. According to the present invention, the instructions comprised by the control signal may e.g. comprise instructions for actuators, electronic control circuitry, transducers or electronic means for measuring, or any other instructions for which a specific time of execution may be relevant. Furthermore the armed control signal may initiate a sequence of instructions e.g. measurements at a predefined interval and continuing these measurement until a control signal with "stop" instructions is received.

According to the invention knowledge of the maximum transmission time between two nodes in the data communication network of the wind power system and knowledge of a precise time signal may significantly improve the possibilities for accurate and sophisticated analysis of the wind power system.

Throughout this description reference signal may also be referred to as precise time. Reference signal or precise time comprises an absolute or relative representation of time in a time domain with a certain precision. Hence a high precision reference signal is accurate with a minimum of jitter enabling the internal time of a plurality data processors to be synchronous with the time domain.

According to the invention the reference signal is a precise time and is global in the sense that it is distributed to all elements or at least the majority of elements of the wind power system. Thereby it is possible all data processors of the wind power system to refer to the precise time.

A derivative of the reference signal may e.g. be derived by frequency division and used for synchronizing the data processors. Thereby it is possible to use the same reference signal for all data processors regardless of their demands.

The reference signal may e.g. be distributed by means of a data communication network e.g. the same data communication network also used for communicating control and measuring data or distributed by a separate network or wiring.

According to the invention the reference signal may be transmitted through air e.g. in a wireless network or through cables e.g. made of cobber, fibres, etc. Furthermore the reference signal may also be derived from a GPS signal.

In an embodiment of the invention said transmission time estimate is established on the basis of a plurality of transmission and processing delay representations.

The transmission time estimates may be established on the basis of several transmissions and processing delay representations, i.e. several particular delays measured, calculated or otherwise derived from the real network, or estimated or predicted from simulations or theoretical considerations. The transmission time representations are preferably based on information obtained from previous data transmissions. The transmission time estimate may be based on all previous delay representations, or the significance of the representations may be weighed by their age. Preferably, only a limited number of previous delay representations are used to establish the transmission time estimate, e.g. in terms of number or age. The establishment of a transmission time estimate on the basis of a number of transmission time representations may e.g. comprise choosing the longest delay amongst the representations, averaging the delays of all the representations, averaging the delays with a weight according to their frequency, probability or distribution, etc.

In an embodiment of the invention said armed control signal comprises an instruction to perform a measurement and wherein said transmitting of said armed control signal from said node to said remote node is performed prior to a time where a result from the measurement is needed by said node by a time interval which corresponds to or is greater than twice the established transmission time estimate plus a measurement time.

The term, "measurement time" refers to the time it takes for the data processor to interpret the control instruction, perform a measurement in accordance therewith, and establish a data signal with the result. By considering the estimated, accumulated time it takes before a measurement result is received at the central controller after the instruction to carry out the measuring is sent, the central controller is able to know whether or not it will be able to benefit from a particular measurement, including whether or not it will have time, including transmission time, to have a data processor at a remote node carry out a consequential control act.

In an embodiment of the invention said data processors are part of a wind turbine controller, substation controller or a central controller of a wind power plant.

In an embodiment of the invention said wind power system comprises a plurality of remote nodes with transmission time estimates established between said node and said remote nodes, and wherein said controlling said wind power system comprises transmitting armed control signals to a low delay part of the remote nodes that are characterized by transmission time estimates that enables execution of an execution instruction at a defined time of execution.

Hereby, it becomes possible to execute control instructions with very short notice in a controlled manner in that the central controller knows which data processors in which wind turbines will be able to receive the instruction prior to the execution time. This enables a central controller in the wind power plant to take advantages of wind turbines or substations with short transmission time. Another benefit of this is that the central controller can avoid having data processors with long transmission times performing the instructions after the desired time of executions, which in the worst case could even amplify an adverse condition in a wind power system.

In an embodiment of the invention said low delay part of the remote nodes are utilized for high precision aerodynamic control of blades of wind turbines of the wind power system.

According to the invention the aerodynamic control may include pitch, edge flap control alone and in combination with pitch control.

In an embodiment of the invention said low delay part of the remote nodes are utilized for high precision control of power converters of wind turbines or substations of the wind power system.

Hereby, the high precision control of the power converters enables the wind turbine controller or substation controller to shape the power output. Shaping the output can be in form of changing the frequency, phase angle, voltage, etc in the sinusoidal power output from the wind turbine.

The high precision control of the power converters may be made based on at least one operational value in the utility grid e.g. voltage, phase angle, frequency, etc.

A substation may be used for storing energy e.g. produced by wind turbines and by high precision control of power converters of such energy storing substations, it becomes possible to perform a precise control of accumulation of the produced energy. Accumulation of energy could e.g. be in form of compressed air, batteries, etc.

Furthermore it becomes possible to shape the power output from an energy storage device, which is advantageous e.g. in situations where the wind turbines are not producing energy e.g. due to low wind speed. In such a situation it is possible for an energy storage to deliver energy to the grid and because of the high precision control of the power converter of the storage device, the power output form the energy storage can be shaped to comply with demands from the grid.

In an embodiment of the invention a transmission attribute, e.g. a priority attribute or a quality attribute, is associated with said armed control signal, and wherein said establishing a transmission time estimate between said node and said remote node comprises establishing transmission time estimates for different values of said transmission attribute.

Two or more different transmission times may exist between the same two nodes depending on the value of one or more transmission attributes. This may e.g. be in the event that the control signals are associated with a priority attribute, where a value of e.g. "high priority" causes the control signal to be passed through the network where possible with less delay than e.g. with the priority attribute value "normal".

In an embodiment of the invention said controlling of said wind power system comprises executing a prediction algorithm or a simulation algorithm to predict control acts that may be significant to carry out in a future, and wherein a prediction time period is determined at least partly on the basis of said established transmission time estimate.

The knowledge of the transmission time estimates may be used to set how far into the future the prediction or simulation algorithms of a control system are required to see. For example, if the transmission time estimate between the central controller and a particular wind turbine controller is 10 ms, a fault prediction algorithm should predict at least 10 ms into the future, plus any time needed to process a predicted alert and establish the control signal. If the transmission time estimate to a different wind turbine controller is only 5 ms, the fault prediction algorithm could wait another 5 ms before establishing the control signal for the second wind turbine, and thereby probably establish a more precise control instruction.

In an embodiment of the invention a time represented by said reference signal is precise to the nearest microsecond.

The reference signal is a precise time signal originated from a time synchronisation arrangement located internal or external to the wind power plant. The precise time signal, also in this description referred to as precise time, represents a precise time domain to which data processors may be synchronized.

The reference signal is a precise time signal and is global in the sense that it is distributed to all or at least a subset of all elements of the wind power system and creating a global precision time within the wind power system. It is therefore possible for all or for a subset of all data processors of the wind power system to refer to the precise time signal; hence the data processors which refer to the reference signal thereby become synchronized.

In an embodiment of the invention said controlling of said wind power system comprises executing an execution instruction synchronous in at least two remote nodes.

The communication between nodes in the data communication network may be based on time-triggered protocols and time-triggered Ethernet.

In an embodiment of the invention said reference signal being generated by one or more clock generating units comprised by said time synchronization arrangement, and wherein said time synchronization arrangement thereby forms a fault-tolerant network ecosystem.

The fault-tolerant network ecosystem may comprise time one or more synchronization arrangements. Such time synchronization arrangements may comprise clusters of clock generation units or circuitries generating a clock or reference signal in mutual cooperation. Hence if one clock generating unit fails another clock generating unit of the cluster continues to generate the reference signal. In this way a time synchronization arrangement is still capable of producing a reference signal if one clock generating unit fails.

In the same way if the network ecosystem e.g. comprises two or more time synchronization arrangements the network ecosystem becomes fault-tolerant i.e. if one of these time synchronization arrangements fails another time synchronization arrangement continues to produce and distribute the reference signal in the network ecosystem.

It should be mentioned that by introducing redundancy in the network ecosystem the fault-tolerance in the network ecosystem may be increased as described below.

Moreover the invention relates to a system for carrying out the methods described above.

DETAILED DESCRIPTION OF THE INVENTION

The term "wind power system" is in accordance with an embodiment of the invention understood as a system related to the generation of power by means of the wind. A preferred example of a wind power system is a wind power plant WPP comprising a plurality of wind turbines WT and substations SUB, where control/monitoring units are comprised in a wind turbine WT or substation SUB. Hence, according to the invention, an element of a wind power system could be any unit related to a wind power plant WPP or utility grid GD.

The term "data processor" DP may in accordance with an embodiment of the invention be understood as any arrangement or element that is related to processing of data. A data processor DP may be a controller or part of a controller e.g. in measurement equipment for measuring or monitoring of e.g. transformers, lightning, power, condition monitoring of physical elements of the wind power system, etc.

A data processor DP is understood as a unit using or referring to an external or internal clock in processing of data e.g. initiating measurements, activating actuators, comparing or calculating data. Examples of elements of a wind power system comprising one or more data processors DP may be wind turbine controller WTC, top controller TC, pitch controller PIC, power converter PC, hub controller HC, power controller PWC, control unit for transformers, etc.

A data processor DP may physically be embodied in a PLC (PLC: Programmable Logic Controller), a DSP (DSP: Digital Signal Processor), a fuzzy logic computer, a biological computer, a neural logic computer or another hardware processing data. It should be noted that a data processor DP may also be understood as software which is dependent or independent on hardware when processing data.

The term "wind power plant" WPP is a term covering elements needed for a wind power plant WPP to produce energy. Such elements could e.g. be wind turbines WT, substation SUB, control units located internally or externally to the wind power plant WPP.

The term "wind turbine" WT may be a term covering every unit internal or external to the wind turbine. Examples of such units could e.g. be measuring units for measuring wind speed, vibrations, output power, etc. or everything which is used in relation to wind turbines WT such as gear, generator, converter, pitch mechanisms, etc.

The term "substation" SUB is a term covering everything included in a wind power plant WWP except for the wind turbines WT; hence, the term substation SUB may cover control units and servers, metrological equipment, phase compensation equipment, transformers, energy storage device, etc.

The term "jitter" may be understood as unwanted variation of one or more characteristics of a periodic signals e.g. in electronics. Jitter may be seen in characteristics such as the interval between successive pulses, or the amplitude, frequency or phase of successive cycles. In other words jitter may be interpreted as an expression related to the precision of e.g. time between two clocks e.g. differences in time in data processors of the same time domain. Jitter is a determining factor e.g. for the simultaneity of samplings, measurements or activating actuators by data processors DP of the same time domain and for synchronizing of physical separated nodes in a network.

Jitter can be measured in a number of ways, relative to absolute time, another signal or the output clock itself. The first is commonly referred to as absolute jitter or long-term jitter, the second as tracking jitter or input-to-output jitter, when the other signal is the reference signal. If the reference signal is perfectly periodic such that it has no jitter, absolute jitter and tracking jitter for the output signal are equivalent. The third measurement, relative to the output clock, is often called periodic, or cycle-to-cycle, jitter. Cycle-to-cycle jitter can be measured as the time-varying deviations in the period of single clock cycles, or in the width of several clock cycles (referred to as cycle-to-Nth-cycle jitter).

The term "data packet" may be understood as data bits representing information which is to be transmitted from a first to a second node in a data communication network DCN.

Figure 1:
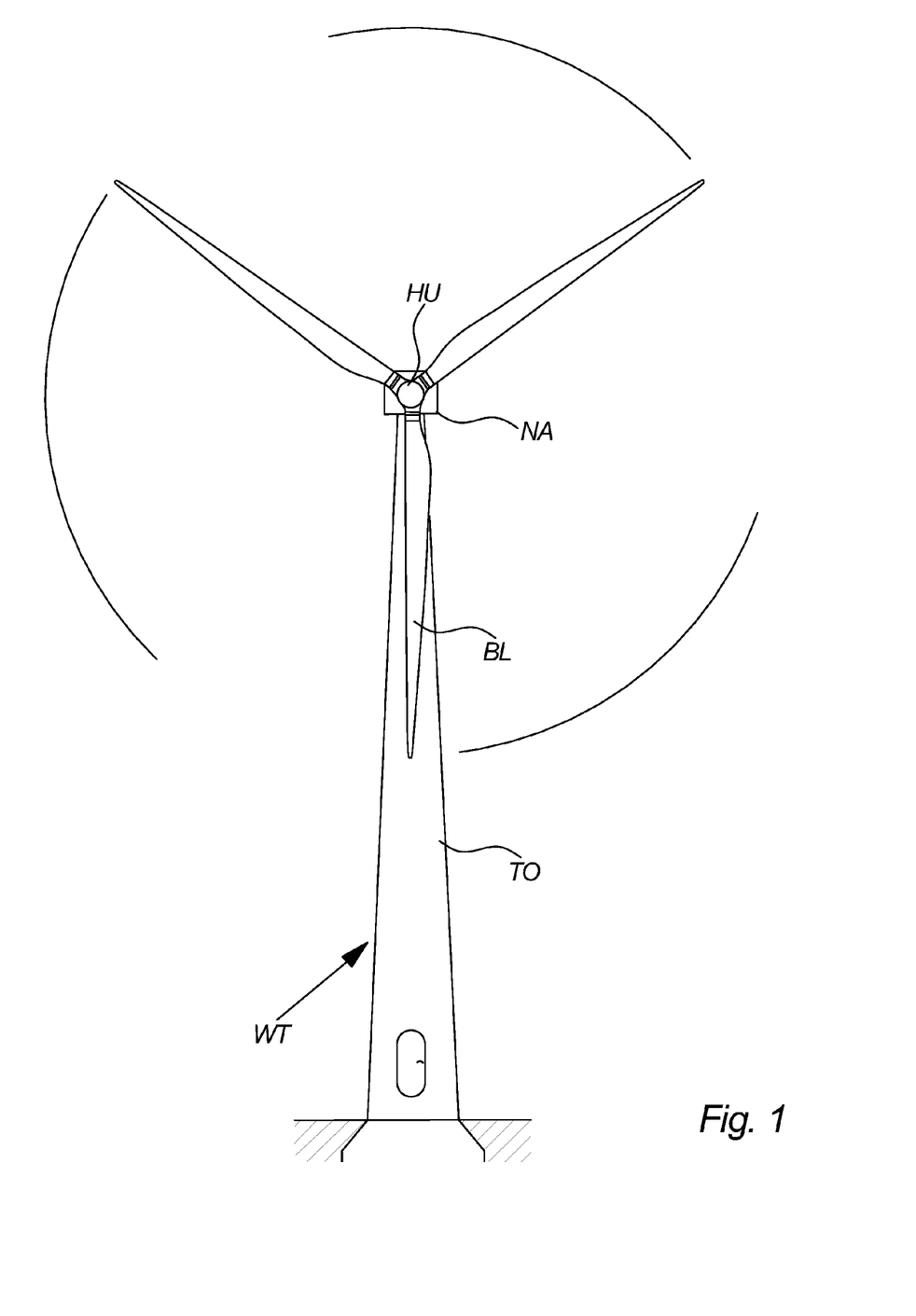
FIG. 1 illustrates a modern wind turbine.

FIG. 1 illustrates a modern wind turbine WT. The wind turbine WT comprises a tower TO positioned on a foundation. A wind turbine nacelle NA with a yaw mechanism is placed on top of the tower TO.

A low-speed shaft extends out of the front or back of the nacelle and is connected with a wind turbine rotor through a wind turbine hub HU. The wind turbine rotor comprises at least one rotor blade BL e.g. three rotor blades BL as illustrated.

Figure 2:
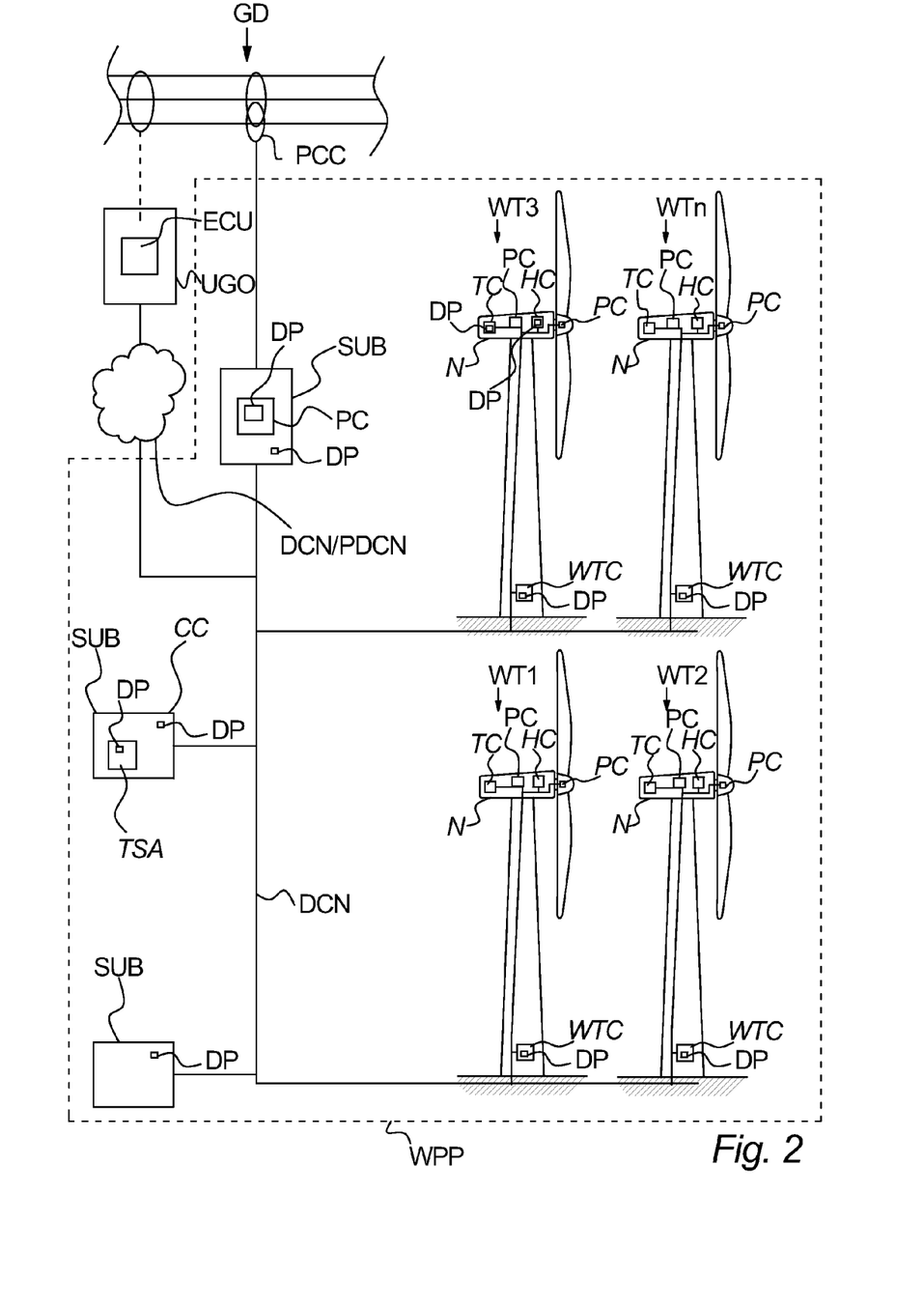
FIG. 2 illustrates a wind power plant.

FIG. 2 illustrates an overview of a typical wind power plant WPP, according to an embodiment of the invention. The illustrated wind power plant WPP comprises a number of wind turbines WT1-WTn located within a geographical area onshore or offshore. Furthermore, the wind power plant WPP may include one or more substations SUB e.g. metrological stations, filters, converters, capacitor banks, etc. The wind power plant WPP may be assembled to constitute a total unified power producing unit that can be connected to the utility grid.

The elements of the illustrated wind power plant comprising different controllers such as wind turbine controller WTC, top controller TC, pitch controller PIC, power converter PC, hub controller HC, power controller PWC, control unit for transformers, etc.

A wind power plant WPP typically has a "master" or central controller CC. The central controller CC may, according to an embodiment of the invention, be located as part of or in relation to a SCADA (SCADA; Supervisory Control And Data Acquisition) server. The central controller CC may physically be located external to the wind power plant WPP or in relation to a substation SUB which may comprise a number of computers or processing units including data processors DP.

The central controller CC may typically comprise means for continuously controlling and monitoring the condition of the wind power plant WPP, including e.g. wind turbines WT and substations SUB. Furthermore, the central controller CC may collect data which may be used in statistics or analyses on operation and may at the same time send/receive control related data to and from elements of the wind power plant WPP.

The wind power plant WPP may communicate with external control units ECU e.g. located at a utility grid operator UGO. The communication between the utility grid operator UGO and the wind power plant WPP e.g. in form of the central controller CC may be through a public data communication network PDCN such as the internet.

Within the wind power plant WPP, the central controller CC may be connected to the internal data communication network DCN connecting control and monitoring units of the wind turbine WT and substations SUB. The data communication network DCN within the wind power plant WPP may e.g. be a parallel or serial network implemented e.g. wireless or by means of optical or copper cables. Preferably, the data communication network DCN is a LAN (LAN: Local Area Network) or WLAN (WLAN: Wireless Local Area Network) and/or e.g. a part of a public data communication network PDCN, such as e.g. the internet or an intranet.

It should be mentioned that the network ecosystem also referred to as data communication network DCN of the wind power system may be fault-tolerant e.g. by redundancy in the network ecosystem. Such redundancy may be obtained by having double, triple or multiple communication paths within the network ecosystem.

A fault-tolerant network ecosystem may be understood as a data communication network DCN where the synchronisation of data processors DP may still be obtained even though a clock generating unit or a node such as a data processor DP in the data communication network DCN fails.

The redundancy may be implemented in the entire network ecosystem of the wind power system i.e. both at wind power system level e.g. between wind turbines WT, between wind turbines WT and substations SUB, etc. in the network ecosystem within the individual system elements of the wind power system e.g. between units of a wind turbine WT such as control and monitoring units, between units in a substation SUB, etc.

It should be understood that redundancy in the network ecosystem should also be understood as including redundancy between units comprised in a plurality of wind turbines WT and substations SUB.

The control related data may typically be data related to control of a wind turbine WT or substation SUB. The control related data may be instructions to a wind turbine WT or substation e.g. to change the produced power (e.g. frequency or phase angle), activate or deactivate actuators, take measurements, pitch blades, etc.

The data communication network DCN may also be utilized for transmitting monitoring data e.g. within a wind power plant WPP between substations SUB, wind turbines WT, controller units, etc. Furthermore, the data communication network DCN may be used to transmit monitoring data to and from the central controller CC, if the central controller CC is not located within the wind power plant WPP. Monitoring data may e.g. be a reading of a pressure, temperature, vibrations, wind speed, output of the individual wind turbines WT or any other measured data within a wind power plant WPP. The measurements may be used later e.g. for statistic-, analytic- or control purposes.

The present invention is preferably utilized within a wind power plant WPP comprising a plurality of wind turbines WT and substations SUB but may be utilized within one single wind turbine WT or substation SUB.

Figure 3A:
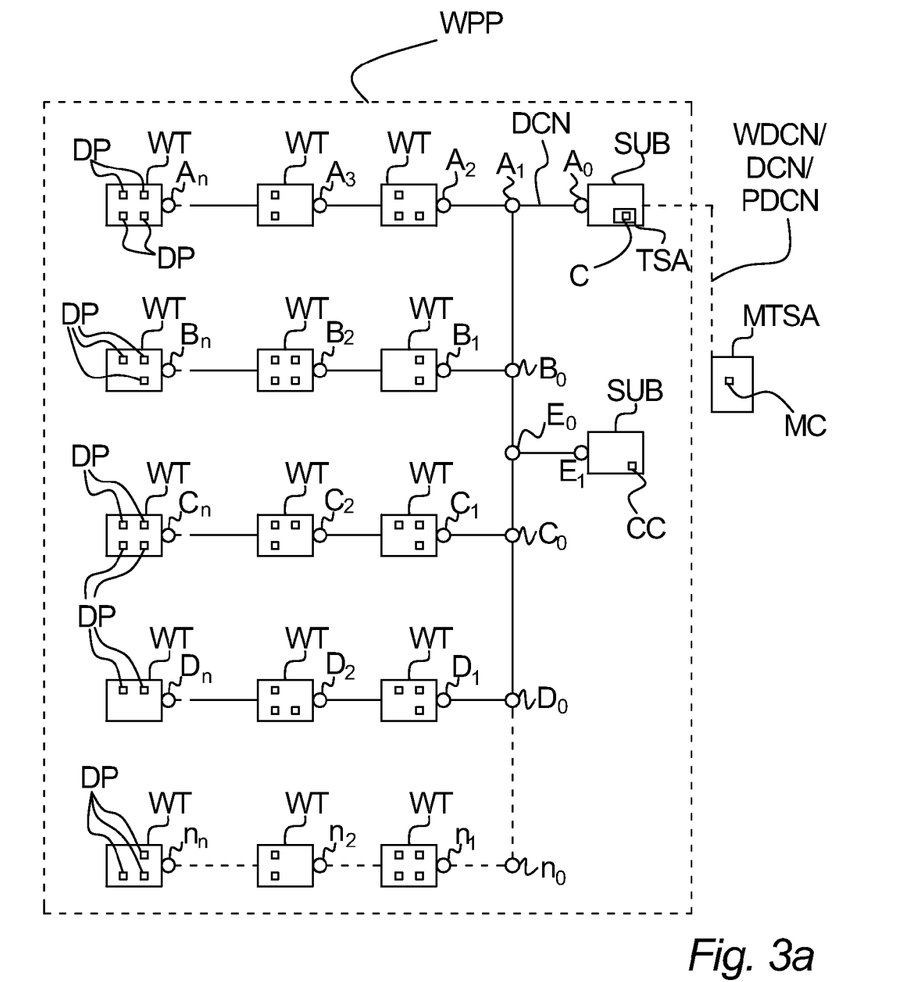
FIG. 3a illustrates the communication network of a wind power plant according to an embodiment of the invention and FIG. 3b illustrates an example of delays in a data communication network.

FIG. 3a illustrates a simplified overview of a wind power plant WPP including a number of wind turbines WT and substations SUB in rows A-n, interconnected via a data communication network DCN. Evidently, other equipment may be present in a wind power plant WPP as described with reference to the description of FIG. 2. The illustrated wind turbines WT and substation SUB may comprise a plurality of internal data processors DP for processing data related to measure and control of the wind power plant WPP. At least part of the data processors DP is synchronized according to a precise time domain represented by a precise time originating from the time synchronizing arrangement TSA or master time synchronizing arrangement MTSA. The precise time is referred to as precise time PT throughout this document.

The precise time PT is handled or distributed from the time synchronizing arrangement TSA to the data processors DP of the wind power plant WPP by a precise time protocol such as IEEE-1588. The precision time protocol used to distribute the precise time PT ensures that the time domain in each of the wind turbines WT and substations SUB is as precise as the precise time PT. In other words data processors DP are able to synchronize their internal clock/internal ticks with the precise time PT of the time domain.

Alternatively the time synchronizing arrangement TSA or master time synchronizing arrangement MTSA may comprise a cluster of clock generation units from which the precise time PT originates and from which the precise time PT is distributed to relevant data processors DP via the data communication network DCN. According to this alternative way of creating a precise time PT or in combination with the use of a precise time protocol as described above the relevant data processors DP are able to synchronize their internal clock/internal ticks with the precise time PT.

As described above using a cluster of clock generating units introduces or increases the fault-tolerance of the precise time PT in the network ecosystem. In this way the precision of the precise time PT is maintained e.g. in a situation where one clock generating unit (also referred to as clock C) fails. In such situations the relevant data processors DP may continue to synchronize their internal clock signal/internal ticks to the precise time PT.

The result of having a fault-tolerant precise time PT in combination with a fault-tolerant data communication network DCN as describes above is a network ecosystem of a wind power system comprising synchronous data processors even in situations where a clock generating unit or a node in the data communication system fails.

With this said, it should be mentioned that in order to apply or increase the fault-tolerance of the reference signal or precise time PT within the network ecosystem it may be advantageous to build up a cluster of clock generating units or clocks C. The effect of having a cluster of clock generating units is that if one of the clock generating units of such cluster fails, there is always a further clock generating unit in the cluster to ensure an reference time in the network ecosystem.

It should be noted that the precise time domain does not have to be distributed to all wind turbines WT or substations SUB and that e.g. data processors DP of the wind power system may contribute with jitter so that the time domain e.g. in a wind turbine WT may not be completely identical with the time domain represented by the precise time PT.

Furthermore, it should be noted that a plurality of standards or protocols may be used to communicate a precise time PT to elements of a wind power plant WPP and that it may even be possible to develop a new protocol for this specific purpose. Besides the already mentioned IEEE-1588 it may be advantageous to use other precise time protocols or base development of new time synchronizing protocols on other protocols than IEEE-1588. Such protocols could e.g. include the IEEE-1588 with wireless protocol extensions, NTP (NTP; Network Time Protocol), SNTP (SNTP; Simple Network Time Protocol), etc. depending on the network.

Furthermore, it should be mentioned that many industrial real-time LAN protocols can be supported by a precision time such as e.g. POWERLINK™, EtherCAT™, ProfiNET™, etc. Furthermore, it should be mentioned that fault-tolerant clock generation and distribution can be supported by industrial real-time LAN protocols such as TTEthernet (TTEthernet; Time-Triggered Ethernet). It should be noted that some of the above-mentioned protocols or standards are proprietary.

A time synchronization arrangement TSA is illustrated in the wind power plant WPP in FIG. 3a where data processors DP of the wind turbines WT and substations SUB may be connected to the time synchronization arrangement TSA via a data communication network DCN. The time synchronization arrangement TSA comprises at least one clock C from which the at least one precise time PT originates. The internal clock of at least part of the data processors DP of the wind power plant WPP is synchronized to this precision time PT and thereby at least one global precision time domain within the wind power plant is created.

It should be noted that elements outside the wind power plant WPP may also have access to the precise time and thereby the global precision time domain.

According to the invention, at least two time synchronization arrangements TSA or one time synchronization arrangement TSA and one master time synchronization arrangement MTSA is present in relation to the wind turbine plant WPP. This redundancy is a security measure if a defect should occur in one of the synchronization arrangements. During normal operation one clock C in one time synchronization arrangement TSA/MTSA is appointed as "master clock", hence, all other clocks C and data processors DP refers to the precise time PT originating from this "master clock".

In case the time synchronization arrangements TSA comprises more than one clock generating unit CU these clock generating units CU may form one or more clusters of clock generating units CU within the time synchronization arrangements TSA. Hence such time synchronization arrangement TSA becomes fault-tolerant because if one clock generating circuitry CGC fails, another clock generating circuitry CGC of the cluster ensures the functionality of the time synchronization arrangement TSA.

Furthermore when such fault-tolerant time synchronization arrangements TSA is connected in a data communication network DCN such network becomes fault-tolerant i.e. the time synchronization arrangements TSA then forms a fault-tolerant network ecosystem. In such network ecosystem the plurality time synchronization arrangements TSA comprising clusters of clock generating units CU are compensating each other in case of fault in one time synchronization arrangement TSA, thereby ensuring that the time synchronization arrangements TSA always are able to create and distribute a precise time PT.

The same redundancy principle is preferably found in the distribution of the precise time PT in the data communication network DCN. Because it is important to the data processors DP to receive the precise time PT, a redundancy such as e.g. retransmission of the precise time PT may be performed to secure that the precise time PT reaches the data processors DP expecting the precise time PT. In case the precise time PT fails to reach certain data processors DP this may affect the entire wind power plant performance.

Redundancy in the data communication network DCN may also be established in form of an additional data communication network, hence in case a fault such as e.g. a broken cable or defect network switch occurs in the data communication network DCN the precise time PT is transmitted to the data processors DP via the additional data communication network. Such additional data communication network could e.g. be a wireless, optical or wired network.

During operation in a master/slave configuration one clock C in one time synchronization arrangement TSA/MTSA is appointed as "master clock", hence, all other clocks C and data processors DP refers to the precise time PT originating from this "master clock". If the "master clock" fails, a clock C of one of the other time synchronization arrangements TSA takes over and produces the precise time PT. Which of the additional time synchronization arrangements TSA are taking over, may be determined in advance depending on the system and is preferably happening without degradation of the established system wide precision global time.

During operation in a multiple master configuration two or more time synchronization arrangements TSA may form a network ecosystem in the data communication network DCN generating the precise time PT in mutual cooperation. Such time synchronization arrangements TSA may comprise clusters of clock generating units. If one time synchronization arrangement TSA fails e.g. if one clock generation unit fails, the remaining time synchronization arrangements TSA in the ecosystem continue generating the precise time PT thus ensuring flawless generation of the precise time PT in single or multiple failure scenarios.

It should be noted that the precise time PT may be received centrally at e.g. a wind turbine WT and then via the internal LAN of the wind turbine WT be distributed to the data processors DP of the wind turbine WT.

The time synchronization arrangement TSA may be software or hardware implemented in the wind power plant WPP e.g. as part of the central controller CC or as a stand-alone unit. The time synchronization arrangement TSA continuously communicates e.g. by distributing/broadcasting a precise time PT to at least part of the data processors DP within the wind power plant WPP. The precise time PT may be distributed via data communication networks DCN and methods as described above.

As described the precise time PT creates a time domain which at least a part of the data processors DP distributed e.g. in substations SUB and wind turbines WT of the wind power plant WPP refers to. The clock signal within these data processors DP is referring to the precise time PT from the time synchronization arrangement TSA. The time domain or clock signal of these data processors thereby becomes synchronous with the precision time signal PT, with a precision reflecting the precision of the precise time PT. Hence, an event occurring at the same time in different wind turbines WT may be registered in the respective wind turbines WT with a precise time stamp reflecting the precision of the precision time signal PT.

It should be noted that more than one synchronous time domain may refer to the same precision time signal PT.

Each wind turbine WT and substation SUB may include several data processors DP as illustrated in FIG. 3a and a desired part of these data processors DP may be chosen to be synchronized. When the desired number of data processors DP of the wind power plant WPP is synchronized i.e. having a common understanding of the precision in the precise time PT, it is possible to perform a very precise and reliable control and analysis e.g. comparison of specific events or effect of events occurring in the wind power system.

It should be noted that the time synchronization arrangement TSA may be located externally from the wind power plant WPP. Such external located time synchronization arrangement TSA may be communicating with elements of the wind power plant WPP e.g. via a wireless data communication network WDCN, earth satellite system such as a GPS, or preferably through an existing data cable/fiber data communication network.

Within a wind turbine WT, when a wireless signal such as the precise time PT e.g. in form of a GPS signal is received, it may be distributed via the internal LAN of the wind turbine WT.

The precise time PT from the synchronization arrangement TSA may be independent from existing internal time signals of the wind power plant WPP and thereby the precise time PT becomes a reference signal.

It should be noted that it may not be relevant to synchronize all data processors DP of e.g. a wind turbine WT or substation SUB. Furthermore it should be noted that the data processors DP are distributed within elements of the wind power system (also referred to as system elements) so that one system element may comprise a plurality of data processors while another system element comprises only a few data processors or even none at all.

As described above the precise time PT is distributed to the elements of the wind power plant WPP and in addition hereto control and measuring data is also distributed on the data communication network DCN.

The data communication network DCN links the elements of the wind power plant WPP together enabling data communication between the elements. The link may be wireless, cables, optical fibers, etc. and may comprise a plurality of nodes A-Nn as illustrated in FIG. 3a.

Figure 3B:
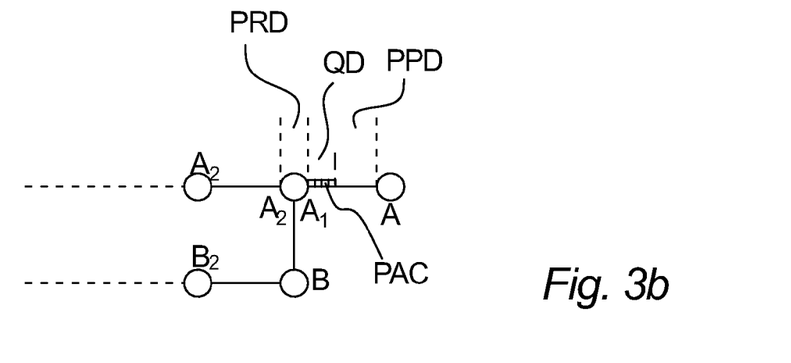

FIG. 3b illustrates part of the data communication network DCN described above and illustrates some of the delays that delay a data packet PAC in the data communication network DCN. These delays may include processing delay PRO, queuing delay QD, propagation delay PPD, etc. and a summation of the mentioned delays forming the majority of delay a data packet PAC experiences from the time it is sent out until it is received. It should be noted that in relation to transmission start and receiving of a data packet PAC, further delays may occur. A summation of the delays typically is in order of milliseconds or less.

The processing delay PRD defines the time used e.g. to examining the data packet's PAC header for determining where to direct the data packet PAC, check data packet PAC for errors, etc.

The queuing delay QD occurs e.g. when a data packet PAC is waiting at a node to be transmitted further on through the network. The queuing delay QD depends on the congestion of the network, hence, if a plurality of data packets PAC have arrived and are waiting e.g. at a node, the queuing delay QD for the next data packet PAC to arrive at the node may be large. On the other hand, if no data packets PAC are waiting at the node, no queuing delay QD occurs for the next data packet PAC.

The propagation delay PPD defines the time required of a data packet PAC/bit to propagate e.g. from one node to the next node on the link/in the network; hence, the longer physical distance between a first and a second nodes, the larger propagation delay PPD in transmitting data from the first to the second node. Of course the propagation delay PPD also depends on type of network e.g. cables, wireless, fibers, etc.

As indicated above different delays may occur in a data communication network DCN and the duration of these delays depends e.g. on type of network, congestion of the network, size of the data packet PAC, etc. hence it is, if no preconditions is taken, it may be very hard to predict the delay in a data communication network DCN in advance.

However some network protocols are based on time division of data transmission (e.g. TDMA: Time Division Multiple Access protocols) which only allow nodes to send data packages in predetermined time slots. This kind of networks has no congestion in network switches, and only a small node processing delay, if any, due to scheduling mechanisms. These network protocols can be highly deterministic, thus enabling very reliable calculations on worst-case transmission time.

Other network types rely on master-slave protocols that also prevent more than one node at a time from transmitting data (e.g. Ethernet POWERLINK and EtherCAT), which may also solve the problem with congestion on the network. Also these network types are highly deterministic and enable very reliable calculations on worst-case transmission times. Both mentioned types of network are often used in hard real-time systems.

Because of the dynamical nature of size of the total delay in the data communication network DCN, it may be critical to depend on the fact that a data packet PAC will reach its destination within a given time. Hence, it is very hard to predict the exact time of arrival of a critical control signal at a control unit.

Therefore, according to the present invention to optimize control of a wind power system, knowledge of the maximum transmission time in the data communication network DCN is necessary. The maximum delay in the data communication network DCN may be estimated or defined e.g. by using one of the following methods.

One estimation method for estimating transmission time in a network for hard real-time control of a wind power plant WPP, wind turbine WT or substation SUB is calculating a worst-case transmission time based on detailed knowledge of the network topology and function, combined with a deterministic protocol. In a network for hard real-time control, it is unlikely that the network is dynamic e.g. because of the use of a deterministic time protocol.

In dynamic network configurations one of the following methods of testing/estimating the transmission time is preferred, because of the dynamic nature the dynamic network configurations will often require frequent measurements of transmission times in the data communication network.

The maximum transmission time in the data communication network DCN may be found by testing the data communication network. The central controller CC of a wind power plant WPP may send out test signals or "ping" the controllers of e.g. substations SUB and wind turbines WT. The controllers of the substations SUB and wind turbines WT then "answer" to the test signal and thereby it is possible for the central controller CC to calculate the maximum transmission time in the data communication network DCN.

In a more advanced embodiment, the central controller CC or part of the central controller CC may keep track of the congestion of the data communication network DCN and take the congestion into consideration along with the response to the test signal. This might be necessary if the test signal is distributed when there is no congestion on the data communication network DCN.

The test signal may according to an embodiment of the invention be included in a data packet PAC in form of a bit e.g. in the header or a time stamp where the receiving part recognizes the bit or time stamp and respond accordingly.

Propagation delay PPD and other delays in the data communication network DCN may be extracted from the precision time protocol e.g. the IEEE-1588 responsible for the global reference signal. However, such precision time protocol will not provide data on processing delays in the consuming or receiving nodes, hence the latter must be found otherwise.

Such testing of the data communication network DCN is preferably performed continuously so that the central controller CC is updated with the current status on the maximum transmission time in the data communication network DCN.

The maximum transmission time in the data communication network DCN may also be found by using historical data of delay in the network. By analyzing the historical data on delay in the network, it may be possible to picture the maximum transmission time in different situations and based hereon choose a maximum transmission time. In this way it is possible to choose a maximum transmission time within the range defined by the historical data. When choosing the maximum transmission time it is possible to be optimistic and choose a value low relative to the historical data or pessimistic and choose a value high relative to the historical data.

The maximum transmission time in the data communication network DCN may be determined by using a second communication network for part of the data communication. In the second network the delays may be known or calculated because the second network is only used for transmittal of a known quantity of data packets.

The maximum transmission time in the data communication network DCN may be determined by equipping data packets with priority so that high priority data packets are exposed to less delay through the network. In this way high priority data packets may only be exposed to known delays and thereby it becomes possible to calculate the maximum transmission time.

It should be noted that all or some of the above ways of identifying the maximum transmission time may be combined depending on the network.

By obtaining a synchronous time domain to which a plurality of data processors DP is synchronized and obtaining knowledge of the maximum transmission time for data packets PAC transmitted through a data communication network DCN identifies two otherwise unknown system dependent parameters in data communication in a wind power system.

Firstly, the precision in the time domain is known because the precise time PT is known as described above. Secondly, the maximum transmission time in transmitting data between nodes in the data communication network DCN is known. This enables designers of control systems (i.e. condition monitoring, measuring, control, etc.) for wind power systems to develop control strategies for different situations and verify/correct these strategies by simulations before the wind turbine WT or wind power plant WPP is put into operation.

These strategies may be utilized e.g. during implementation of a wind power plant WPP or in situations as describe below.

When the wind turbines WT, substation SUB or wind power plant WPP are operational they may be controlled based on the precise time domain and knowledge of the maximum transmission time. This is especially relevant in relation to the control of power output from a wind turbine WT, substation SUB or wind power plant WPP, support of the utility grid in case of grid fault, fault location and distribution within a wind turbine WT, substation SUB or wind power plant WPP, park wide control such as start up, shut down and condition monitoring, etc.

If a grid fault occurs, grid operators GD would like to use wind power plants WPP to support the grid as much as possible. Through knowledge of the two above described system dependent parameters it becomes possible to optimize the wind power plants WPP ability to support of the grid during grid faults.

It may be possible, before the fault occurs e.g. during implementation, to map the wind power plant WPP and thereby predict which wind turbines WT are able to react fast and precisely enough to support the grid. In this mapping, one important factor is the geographical location of the wind turbines WT within the wind power plant WPP, relative to the point of common connection PCC. The location determines the maximum transmission time in the communication link to the wind turbine WT and thereby concurrent whether or not the wind turbine WT is able to react fast enough to support the grid. Furthermore, the precision of the time domain is important. This precision is determining for the ability to control the individual wind turbines WT so that the total change in the output from the wind power plant WPP is most effective e.g. in relation to support of the grid and noise emission on the grid from the wind power plant.

In other words, according to the present invention, because of knowledge of the two above-described system parameters, it becomes possible to transmit data packets PAC comprising control instruction to be carried out at a given point in time, to a plurality of wind turbines WT. By knowledge of the maximum transmission time in the data communication network DCN it is possible for the central controller CC to predict which wind turbines WT are capable of reacting on control signals of the data packets PAC in time to support the grid.

One example of content of the data packet PAC could be set points relating to the output of the wind turbine WT e.g. phase angle, altitude, frequency, etc. and a point in time to change the output to comply with these set points. The central controller CC may send out these control data packets PAC to all the wind turbines which are capable of reacting in time and because the data processors DP of the wind turbines are synchronous with the precise time domain, the output of the wind turbines may be changed precisely according the instructions. Thereby the central controller can control the total output from the wind power plant WPP and shape the output from the wind power plant WPP to support the grid.

One additional effect of the above-described control method is that the grid operator GO is able to predict how much support can be expected from a wind power plant WPP in different situations. Support may e.g. be in form of variations in the produced power (i.e. reactive power, voltage, power angle, harmonics, etc.). Furthermore, park wide control strategies may be determined in advance and initiated when the fault is registered.

In a further embodiment of the invention, knowledge of the two system dependent parameters is used in relation to condition monitoring. Because of the precise synchronous time domain in which a plurality of data processors are able to refer to measurements in a plurality of wind turbines WT can be made synchronous. Such measurements could be on wind speed or deflection of wind turbine blades BL of the first row of wind turbines WT of a wind power plant WPP or wind speed in front of the wind power plant WPP, measured e.g. by lidars or metrological substations SUB In case of occurrence of a wind gust, it is possible for the central controller CC to picture the distribution or effect of the wind gust on wind turbines WT in the successive row because the measurements are made synchronously.

Furthermore, the central controller CC can use the measurements directly without wasting time in interpreting and analyzing the measurements in relation to each other in the time domain. Because the maximum transmission time in the data communication network DCN is known by the central controller CC, it is possible to predict which of the successive rows of wind turbines WT are able to react in time before the wind gust is arriving at these wind turbines WT. Data packets PAC comprising control instructions e.g. to pitch the blades BL are sent to these wind turbines WT and thereby it is possible to minimize the mechanical stress on the wind turbine WT. This method of intelligent park wide control minimizes the congestion of the data communication network DCN because data packets PAC are not broadcasted to all wind turbines of the wind power plant WPP but only to the wind turbines which are able to react in time on the content of the data packets PAC.

Another advantage obtained by identifying the two system dependent parameters according to the invention is that it becomes possible to define the lowest possible delay through the data communication network of the wind power plant WPP. This, together with the synchronous and precise time domain, gives information of the current performance of the data communication network DCN to the central controller CC. This information may be used to map e.g. a wind power park WPP in one or more time frames where wind turbines WT or substations SUB are placed in a time frame depending on maximum transmission time in communication from the central controller CC e.g. combined with knowledge of which data processors DP of the wind turbine WT or substation SUB is synchronous with the precise time domain.

This information may then e.g. be used in congestion control of the data communication network DCN. The central controller CC knows the maximum transmission time from the central controller CC to a wind turbine WT. Furthermore, the central controller CC knows that when e.g. a control signal is received by the wind turbine controller WTC, the control signal is executed at the time the central controller CC expects the control signal to be executed because of the precise synchronic time domain. Hence, because the central controller CC has the above described information, the central controller CC may in case the data communication network DCN is overloaded line up data to this wind turbine WT and wait to the "last minute" to push the control signal onto the data communication network DCN.

An example of park wide control signals which may be lined up could in case of congestion of the data communication network DCN e.g. be signals for controlled start-up or shut-down of a wind power plant WPP.

Knowledge of the two system dependent parameters of a wind power system may according to the invention also be used in analyses of the data communication network. If the time for transmitting a data packet PAC exceeds a predefined maximum transmission time, it is indicated that something is wrong in the data communication network DCN e.g. a fault in a switch or cable. Locating a fault in the data communication network DCN this way may be faster than waiting for a "time out" or request for retransmitting a data packet PAC.

Furthermore, knowledge of the two system dependent parameters of a wind power system may according to the invention also be valuable in relation to measuring and control based on such measurements.

Because of the precise time domain, it is possible to initiate continuous simultaneous park wide measurements e.g. distribution of a wind gust. The result of these measurements may lead to a need for regulation of different elements of a wind turbine WT. If the energy production is optimized or mechanical load of the wind turbine WT is minimized by executing the control signal at a precise point in time, this can be done by the central controller CC, because of knowledge of the two system specific parameters.

In the same way if it is preferred to measure at a precise point in time, knowledge of the two system specific parameters would make this possible by sending out a data packet in time before the measurement is desired. Such measurements may solely be used for analysis of the wind power system.

In relation to the above description of the invention it should be noted that the more precise time domain, the more different ways of utilizing the invention.

Based on the above, the present invention may be used to organize the data traffic, with a view on minimizing the congestion of the data communication network DCN in situations where the data communication network DCN is heavy loaded.

According to the above, the present invention may be utilized for the following measurement scenario. A node is designed or instructed to repetitively measure e.g. temperature or vibrations with reference to the precise time PT. The point in time of performing these repetitively measurements are determined in accordance with the transmission time estimate from the measuring (producing) node to the receiving (consumer) node which are to use the measurements.

According to the invention the embodiments described in relation to the figures illustrated in FIGS. 1-3B can be combined in any combination.

What is claimed is:

1. A method of controlling a wind power system comprising a plurality of nodes and a plurality of data processors distributed in said nodes, the method comprising:
    synchronizing at least a part of said data processors to at least one reference signal distributed to said data processors from a time synchronization arrangement;
    associating at least one of said synchronized data processors with a controller node of the plurality of nodes in the wind power system and associating at least another one of said synchronized data processors with each of a plurality of remote nodes of the plurality of nodes in the wind power system;
    establishing respective transmission time estimates between said controller node and each of said remote nodes;
    generating an armed control signal comprising an execution instruction associated with a time of execution, the execution instruction defining instructions to be executed by a data processor associated with one of the remote nodes at a time defined by the time of execution;
    comparing the time of execution to the respective transmission time estimates to identify at least one of the remote nodes that is capable of receiving the armed control signal before the time of execution; and
    transmitting the armed control signal from the controller node to the identified remote node prior to the time of execution by a time interval at least as long as the respective transmission time estimate associated with the identified remote node.

2. The method of controlling a wind power system according to claim 1, wherein said transmission time estimate is established on the basis of a plurality of transmission and processing delay representations.

3. The method of controlling a wind power system according to claim 1, wherein said armed control signal comprises an instruction to perform a measurement and wherein said transmitting of said armed control signal from said controller node to said identified remote node is performed prior to a time where a result from the measurement is needed by said controller node by a time interval which corresponds to or is greater than twice the established transmission time estimate of the identified remote node plus a measurement time.

4. The method of controlling a wind power system according to claim 1, wherein said data processors are part of a wind turbine controller node, substation controller node or a central controller node of a wind power plant.

5. The method of controlling a wind power system according to claim 1, further comprising:
    identifying a low delay subset of the remote nodes that is characterized by respective transmission time estimates that enable execution of an execution instruction at a predefined time of execution.

6. The method of controlling a wind power system according to claim 5, wherein said low delay subset of the remote nodes is utilized for high precision control of aerodynamic control of blades of wind turbines of the wind power system.

7. The method of controlling a wind power system according to claim 5, wherein said low delay subset of the remote nodes is utilized for high precision control of power converters of wind turbines or substations of the wind power system.

8. The method of controlling a wind power system according to claim 1, wherein a transmission attribute is associated with said armed control signal, and wherein said establishing respective transmission time estimates between said controller node and said remote nodes comprises establishing separate transmission time estimates for different values of said transmission attribute.

9. The method of controlling a wind power system according to claim 1, wherein said controlling said wind power system comprises executing a prediction algorithm or a simulation algorithm to predict control acts that may be significant to carry out at a future time, and wherein a prediction time period is determined at least partly on the basis of said respective transmission time estimates.

10. The method of controlling a wind power system according to claim 1, wherein a time represented by said reference signal is precise to the nearest microsecond.

11. The method of claim 1, wherein the execution time is set based on a need of a utility grid connected to the wind power system.

12. A system for controlling a wind power plant comprising a plurality of nodes and a plurality of data processors distributed in said nodes, the system comprising:
   a synchronizer for synchronizing at least a part of said data processors to at least one reference signal distributed to said data processors from a time synchronization arrangement;
   an associator for associating at least one of said synchronized data processors with a controller node of the plurality of nodes in the wind power plant and associating at least another one of said synchronized data processors with each of a plurality of remote nodes of the plurality of nodes in the wind power plant;
   an establisher for establishing respective transmission time estimates between said controller node and each of said remote nodes;
   an instruction generator for generating an armed control signal comprising an execution instruction associated with a time of execution, the execution instruction defining instructions to be executed by a data processor associated with one of the remote nodes at a time defined by the time of execution;
   a comparing element for comparing the time of execution to the established transmission time estimates to identify at least one of the remote nodes that is capable of receiving the armed control signal before the time of execution; and
   a transmitter for transmitting the armed control signal from the controller node to the identified remote node prior to the time of execution by a time interval at least as long as the respective transmission time estimate associated with the identified remote node.

13. The system of claim 12, wherein the execution time is set based on a need of a utility grid connected to the wind power plant.

14. The system according to claim 12, wherein said armed control signal comprises an instruction to perform a measurement and wherein said transmitting of said armed control signal from said controller node to said identified remote node is performed prior to a time where a result from the measurement is needed by said controller node by a time interval which corresponds to or is greater than twice the established transmission time estimate of the identified remote node plus a measurement time.

15. The system according to claim 12, wherein said data processors are part of a wind turbine controller node, substation controller node or a central controller node of a wind power plant.

16. The system according to claim 12, further comprising:
   before establishing the armed control signal, identifying a low delay subset of the remote nodes that is characterized by respective transmission time estimates that enable execution of an execution instruction at a predefined time of execution.

17. The system according to claim 16, wherein said low delay subset of the remote nodes is utilized for high precision control of aerodynamic control of blades of wind turbines of the wind power plant.

18. The system according to claim 16, wherein said low delay subset of the remote nodes is utilized for high precision control of power converters of wind turbines or substations of the wind power plant.

19. The system according to claim 12, wherein a transmission attribute is associated with said armed control signal, and wherein said establishing respective transmission time estimates between said controller node and said remote nodes comprises establishing separate transmission time estimates for different values of said transmission attribute.

20. The system according to claim 12, wherein said controlling said wind power system comprises executing a prediction algorithm or a simulation algorithm to predict control acts that may be significant to carry out at a future time, and wherein a prediction time period is determined at least partly on the basis of said respective transmission time estimates.

* * * * *

UNITED STATES PATENT AND TRADEMARK OFFICE
CERTIFICATE OF CORRECTION

PATENT NO.        : 8,239,702 B2                                Page 1 of 1
APPLICATION NO.   : 12/787237
DATED             : August 7, 2012
INVENTOR(S)       : Bengtson It is certified that error appears in the above-identified patent and that said Letters Patent is hereby corrected as shown below:

Column 7, Line 45, please delete "form" and insert --from-- therefor;

Column 15, Line 19, please delete "PRO" and insert --PRD-- therefor;

Column 17, Line 48, please delete "GD" and insert --GO-- therefor.

Signed and Sealed this
Fourth Day of December, 2012

David J. Kappos
*Director of the United States Patent and Trademark Office*